(12) United States Patent
Michelitsch et al.

(10) Patent No.: US 9,034,506 B2
(45) Date of Patent: May 19, 2015

(54) BATTERY WITH VOLTAGE-GENERATING CELLS AND AN I-SHAPED OR H-SHAPED INTERMEDIATE ELEMENT ARRANGED THEREBETWEEN

(75) Inventors: Martin Michelitsch, Kumberg (AT); Stefan Röpke, Graz (AT); Mathias Pucher, Graz (AT); Rainer Unterberger, Graz (AT)

(73) Assignee: MAGNA STEYR Battery Systems GmbH & Co OG, Zettling (AT)

( * ) Notice: Subject to any disclaimer, the term of this patent is extended or adjusted under 35 U.S.C. 154(b) by 177 days.

(21) Appl. No.: 13/518,900

(22) PCT Filed: Dec. 23, 2010

(86) PCT No.: PCT/EP2010/070700
§ 371 (c)(1),
(2), (4) Date: Oct. 9, 2012

(87) PCT Pub. No.: WO2011/076940
PCT Pub. Date: Jun. 30, 2011

(65) Prior Publication Data
US 2013/0022856 A1 Jan. 24, 2013

Related U.S. Application Data

(60) Provisional application No. 61/289,894, filed on Dec. 23, 2009, provisional application No. 61/356,239, filed on Jun. 18, 2010, provisional application No. 61/356,071, filed on Jun. 18, 2010.

(51) Int. Cl.
| | |
|---|---|
| *H01M 10/50* | (2006.01) |
| *H01M 2/10* | (2006.01) |
| *B60L 11/18* | (2006.01) |
| *H01M 10/61* | (2014.01) |
| *H01M 10/625* | (2014.01) |
| *H01M 10/647* | (2014.01) |
| *H01M 10/6557* | (2014.01) |

(52) U.S. Cl.
CPC ......... *H01M 2/1083* (2013.01); *B60L 11/1879* (2013.01); *H01M 10/5002* (2013.01); *H01M 10/5016* (2013.01); *H01M 10/5032* (2013.01); *H01M 10/5059* (2013.01); *Y02T 10/7005* (2013.01); *Y02T 10/705* (2013.01)

(58) Field of Classification Search
USPC .................................................. 429/120, 159
See application file for complete search history.

(56) References Cited

U.S. PATENT DOCUMENTS

| | | | | |
|---|---|---|---|---|
| 5,800,942 A | * | 9/1998 | Hamada et al. | ............ 429/148 |
| 2006/0115719 A1 | | 6/2006 | Jeon | |
| 2007/0026303 A1 | * | 2/2007 | Jeon et al. | ............ 429/143 |

FOREIGN PATENT DOCUMENTS

| | | |
|---|---|---|
| DE | 100 02 142 | 8/2000 |
| DE | 10 2008 014155 | 9/2009 |

*Primary Examiner* — Cynthia H Kelly
*Assistant Examiner* — Monique Wills
(74) *Attorney, Agent, or Firm* — Jordan IP Law, LLC; Todd A. Vaughn

(57) ABSTRACT

A battery having a plurality of voltage-generating cells which are arranged in particular adjacent to one another. The battery has a plurality of fastening/bearing points which are spaced apart from one another and on which the battery is fastened or bears. At least a first portion of the cells have a first mass, and optionally further include parts of the battery with an additional mass, and which come to rest between the fastening/bearing points. The first portion of the cells absorbs at least a substantial part of the bending/shear load arising in the battery between the fastening/bearing points. In addition, an I-shaped or H-shaped intermediate element is arranged between at least two voltage-generating cells.

19 Claims, 11 Drawing Sheets

BATTERY WITH VOLTAGE-GENERATING CELLS AND AN I-SHAPED OR H-SHAPED INTERMEDIATE ELEMENT ARRANGED THEREBETWEEN

CROSS-REFERENCE TO RELATED APPLICATIONS

The present application is a National Stage Application of PCT International Application No. PCT/EP2010/070700 (filed on Dec. 23, 2010), under 35 U.S.C. §371, which claims priority to U.S. Provisional Patent Application No. 61/289,894 (filed on Dec. 23, 2009), U.S. Provisional Patent Application No. 61/356,239 (filed on Jun. 18, 2010), U.S. Provisional Patent Application No. 61/356,071 (filed on Jun. 18, 2010), which are each hereby incorporated by reference in their respective entireties.

FIELD OF THE INVENTION

The invention relates to a battery comprising a plurality of voltage-generating cells which are in particular arranged adjacent to one another and comprising a plurality of fastening/bearing points which are spaced apart from one another and on which the battery is fastened or bears, wherein at least a first portion of said cells with a first mass, and optional further constituent parts of the battery with a further mass, come to rest between the fastening/bearing points.

BACKGROUND OF THE INVENTION

Batteries are generally constructed from a plurality of voltage-generating cells in order to be able to deliver a demanded voltage, a demanded current and/or a demanded capacitance. In particular in the case of relatively high-power batteries such as are often used for electric vehicles, it is often the case that several hundred cells are connected to one another. The cells have a correspondingly high total weight and, in particular in an automobile, are subjected to occasionally intense accelerations, for example during braking or when travelling over uneven roadway surfaces. To hold the cells in position in all driving situations, holding devices which are, in part, of extremely massive design are known from the prior art. A disadvantage of said holding devices is that they considerably increase the weight of the battery and therefore of the vehicle. As is readily apparent, the driving performance of the automobile is thereby curtailed.

SUMMARY OF THE INVENTION

It is therefore an object of the invention to specify an improved battery, in particular one which has a reduced weight.

The invention is achieved by means of a battery of the type specified in the introduction in which the first portion of the cells absorbs at least a substantial part of the bending/shear load arising in the battery between the fastening/bearing points, and an I-shaped or H-shaped intermediate element is arranged at least between two voltage-generating cells.

In accordance with the invention, the mechanical structure of the cells is thus utilized to absorb a bending load arising in the battery. The cells often have a relatively massive metal casing. For example, in the case of so-called "metal can" cells, the rolled chemistry-related fittings of the cell are situated in a metal sleeve which is extremely stable and thereby protects the insides of the cell. In accordance with the invention, at least a part of the bending/shear load arising in a battery is now conducted via said cell walls. For optimum force transmission from one cell to the next and also so that the cells remain in position with respect to one another, an I-shaped or H-shaped intermediate element is arranged between said cells. A support structure for receiving the cells, if such a support structure is required at all, can thus be designed to be correspondingly more fragile. It is advantageously possible in this way for the weight of the battery and therefore of the vehicle to be reduced considerably. As a direct result of this, the driving performance of the automobile is improved.

Within the context of the invention, "cells adjacent to one another" means cells between which there is no spacing or only a small spacing. The cells may be in contact with one another, though this is not imperative. It is also conceivable for further components to be arranged between the cells, which components partially or completely fill out the intermediate space between two cells.

Advantageous embodiments and refinements of the invention will now emerge from the subclaims and from the description in conjunction with the FIGS.

It is expedient if the first portion of the cells is provided for absorbing a substantial part of the bending/shear load resulting from the acceleration acting in the vertical direction on the first mass and the optional further mass. A battery is often installed/used substantially in a horizontal position, wherein the battery is supported at at least two points. Owing to the gravitational acceleration acting on the mass of the cells and on the mass of further optional components, a bending/shear load arises in the battery between the bearing points, which bending/shear load is, in accordance with the invention, absorbed to a significant extent by the cells themselves the battery is installed in an automobile and said automobile is travelling on a roadway with an uneven roadway surface, a multiple of the gravitational acceleration may self-evidently also act on said masses, correspondingly increasing the bending/shear load.

It is furthermore expedient if the first portion of the cells is provided for absorbing a substantial part of the bending/shear load resulting from the acceleration acting in the horizontal direction on the first mass and the optional further mass. If the battery is installed/used substantially in a vertical position and the hearing/fastening points are spaced apart vertically, then a horizontal acceleration (for example when the vehicle is braking or cornering) leads to a bending/shear load, analogously to the vertical acceleration. It is self-evidently also possible for combined forces to arise, for example if the bearing/fastening points are spaced apart both horizontally and also vertically.

It is furthermore expedient if the substantial part amounts to at least 50%, preferably at least 75% and more preferably at least 90% of the total bending/shear load. In this way, it is possible for additional support elements to be of relatively fragile and therefore also weight-saving construction. The battery is thus of lighter overall weight, without any significant losses in stability. It is noted at this juncture that the load present in the battery may also be determined on the basis of an equivalent stress. Equivalent stress is an expression from the field of science of strength of materials, and refers to a fictitious single-axis stress which represents the same material loading as a real, multi-axis stress state.

It is furthermore expedient if the first portion of the cells absorbs the entire bending/shear load arising between the fastening/bearing points. In this variant of the invention, the entire load that arises is absorbed by the cells themselves. Additional support elements can therefore be dispensed with.

It is furthermore advantageous if a plate-shaped intermediate element which has elastic ribs at least on one side is arranged at least between two voltage-generating cells. Length compensation can thus take place between the cells by virtue of the ribs being deformed to a greater or lesser extent. The plate-shaped intermediate element is preferably arranged in that region of the cells which is free from the I-shaped or H-shaped intermediate element, such that the transmission of force between the cells takes place predominantly via said I-shaped or H-shaped intermediate elements. Alternatively, the pre-shaped intermediate element may also bear against the I-shaped or H-shaped intermediate element, in particular against the side flanks thereof.

It is particularly advantageous if the ribs bear against a cell, and a groove between two ribs delimits, together with the cell, a channel which is provided for conducting a gaseous or liquid heat carrier. In said variant of the invention, the ribs therefore perform a dual purpose, in that they firstly permit length compensation between the cells but secondly, together with the also form channels through which a heat carrier can flow. As a result of the said dual purpose, the number of components required for a battery can be reduced significantly.

It is expedient if at least two voltage-generating cells and at least one intermediate element are adhesively bonded to one another. In said variant of the invention, cells adhesively bonded to one another form an assembly via which bending/shear forces can be transmitted. It is advantageous for no further components to be required for the connection of the cells.

It is furthermore expedient if at least two voltage-generating cells and at least one intermediate element are screwed to one another. In this way, the cells can also be detached from one another, which offers advantages in particular during the repair or disposal of a battery.

It is furthermore expedient if at least two voltage-generating cells and at least one intermediate element are pressed against one another by means of tension straps or tension rods which generate a compressive preload. In this way, a compressive preload is generated which prevents widening of the gap between two cells in the region in which the bending torque causes a tensile stress. This means that the compressive preload generated by the clamping/tension straps is greater in this region than the tensile stress caused by the bending load. Instead of clamping/tension straps, it is also possible for tension rods, for example stud bolts, to be provided which press the cells against one another via plates. Said measures may self-evidently be used in addition to adhesive bonding.

In one advantageous variant of the invention, the battery comprises a support element which spans at least two fastening/bearing points and which serves for absorbing at least a part of the bending/shear load remaining after subtraction of the part absorbed by the cells. The cells are, under some circumstances, not suitable for absorbing the entire bending/shear load which arises. Instead of adapting the cells, which may possibly involve a large amount of expenditure and leads to non-standardized cells, an additional support element is provided which absorbs that part of the bending/shear load which can no longer be absorbed by the cells.

Finally, it is also particularly advantageous if the support element is hollow and is provided for conducting a gaseous or liquid heat carrier. In said variant of the invention, the support element thus performs a dual purpose in that it firstly absorbs bending/shear forces and secondly also contributes to the temperature control of the battery or of its cells. As a result of the said dual purpose, the number of components required for a battery can be reduced significantly.

The above embodiments and refinements of the invention may be combined with one another in any desired way.

BRIEF DESCRIPTION OF THE DRAWINGS

The present invention will be explained in more detail below on the basis of the exemplary embodiments illustraten in the schematic FIGS. of the drawing, in which.

DETAILED DESCRIPTION OF EMBODIMENTS

Figure 1:
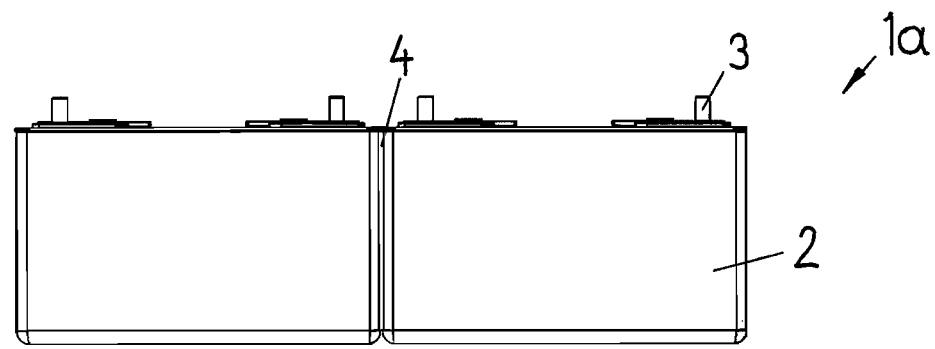
FIG. 1 illustrates a first example of a battery, in which the cells are adhesively bonded to one another.

FIG. 1 illustrates a first example of a battery 1a in a side view. The battery comprises a plurality of voltage-generating cells 2 with in each case two terminal contacts 3. In the example illustraten, the cells 2 are adhesively bonded to one another at the narrow side thereof by means of an adhesive layer 4, such that the battery 1a forms a self-contained unit even without further components. The cells 2, in particular the housing thereof (which is often composed of metal) and the adhesive bond are designed such that the battery 1a is "self-supporting". This means that the cells 2 absorb the bending/shear load resulting from their mass and from gravitational acceleration if the battery 1a is held at fastening/bearing points spaced apart from one another, for example on the left and on the right in FIG. 1.

Figure 2:
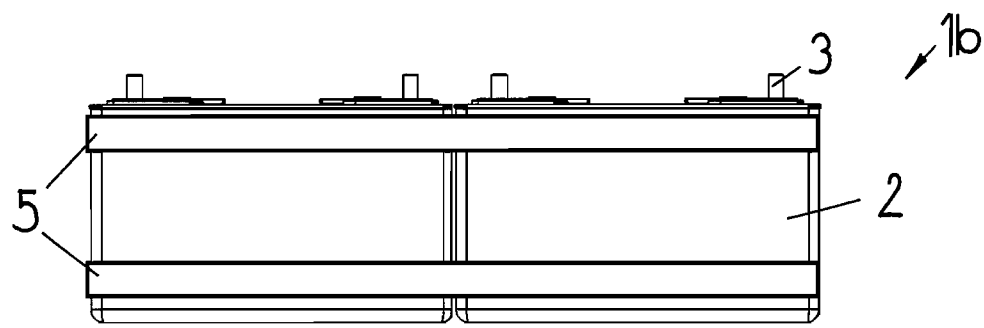
FIG. 2 illustrates a second example of a battery in accordance with the invention, in which the cells are preloaded against one another by means of tension/clamping straps.

FIG. 2 illustrates an alternative embodiment of a battery 1b in accordance with the invention which is very similar to the battery 1a illustrated in FIG. 1. Instead of an adhesive bond, however, the cells 2 are pressed against one another by means of two clamping/tension straps 5. In this way, a compressive preload is generated which prevents widening of the gap between the cells 2 in the lower region thereof. This means that the compressive preload generated by the clamping/tension straps 5 is greater in this region than the tensile stress caused by the bending load instead of clamping/tension straps 5, it is also possible for tension rods, for example stud bolts, to be provided which press the cells 2 against one another via plates. The measures may self-evidently be provided in addition to an adhesive bond.

Figure 3:
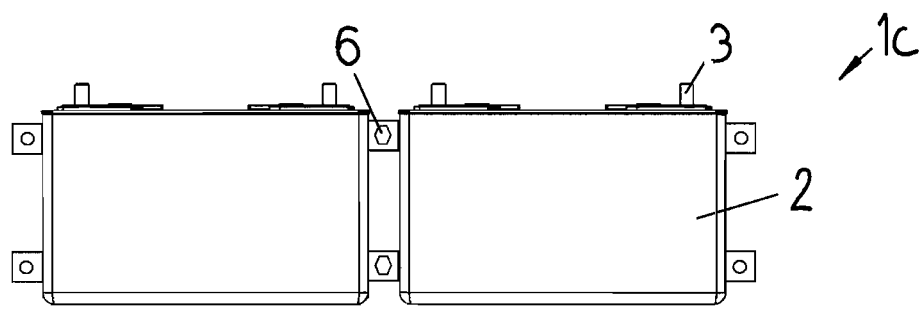
FIG. 3 illustrates a third example of a battery in accordance with the invention, in which the cells are screwed to one another.

FIG. 3 illustrates an alternative embodiment of a battery 1c in accordance with the invention, which is likewise very similar to the battery 1a illustrated in FIG. 1. Instead of an adhesive bond, the cells 2 are now connected to one another by means of screws 6. For this purpose, lugs may be adhesively bonded or welded to the cells 2. In FIGS. 1 to 3, it is also possible for I-shaped or H-shaped intermediate elements to be provided, as illustrated for example in FIG. 14.

Figure 4:
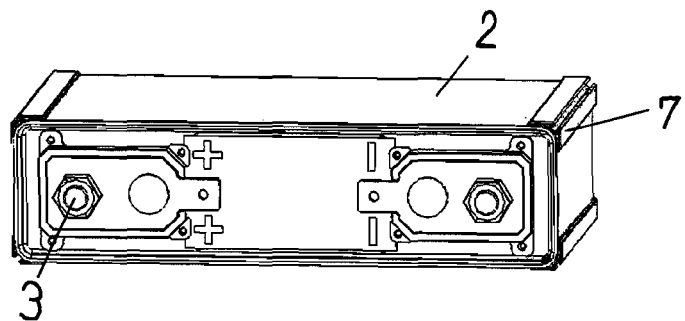
FIG. 4 illustrates a cell with holding devices fastened thereto.
Figure 5:
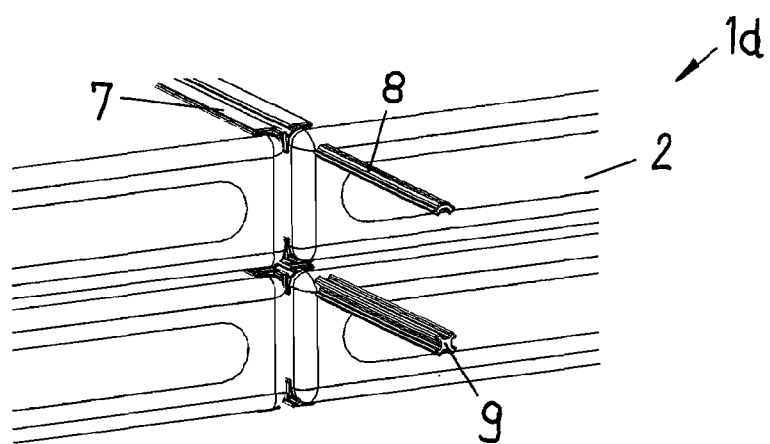
FIG. 5 illustrates, in an oblique view, cells as illustrated in FIG. 4, which cells are connected to one another, thus forming a battery, by means of connecting elements.
Figure 6:
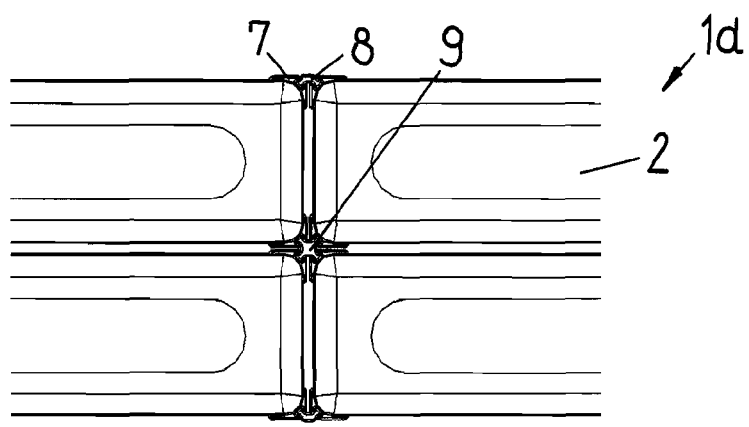
FIG. 6 illustrates the battery from FIG. 5 in a side view.

FIGS. 4 to 6 illustrate a further embodiment of a battery 1d in accordance with the invention, or rather a detail thereof. In this variant, fastening elements 7 are provided on the housing of the cells 2. The fastening elements 7 may be adhesively bonded or welded to the housing, for example in the form of holding or fastening brackets. To connect a plurality of cells 2, L-shaped intermediate or connecting elements 8 or cross-shaped intermediate or connecting elements 9 are connected to the fastening elements 7, such that a self-supporting cell assembly is formed. For this purpose, a fastening element 7 may have indentations/projections, into which projections/indentations of the connecting elements 8, 9 engage. For example, a tongue and groove connection, a pin and hole connection or else a dovetail connection may be realized between the connecting elements 8, 9 and the fastening elements 7. To isolate the cells 2 from one another, the connecting elements 9 may furthermore be composed of an insulator, composed for example of plastic or ceramic. It is also conceivable for the indentations/projections to be formed directly into the housing of the cells 2, and fastening elements 7 can thereby be dispensed with. Four L-shaped intermediate or connecting elements 8 or two cross-shaped intermediate or connecting elements 9 may moreover be combined to form an I-shaped or H-shaped intermediate element (see also FIG. 14).

Figure 7:
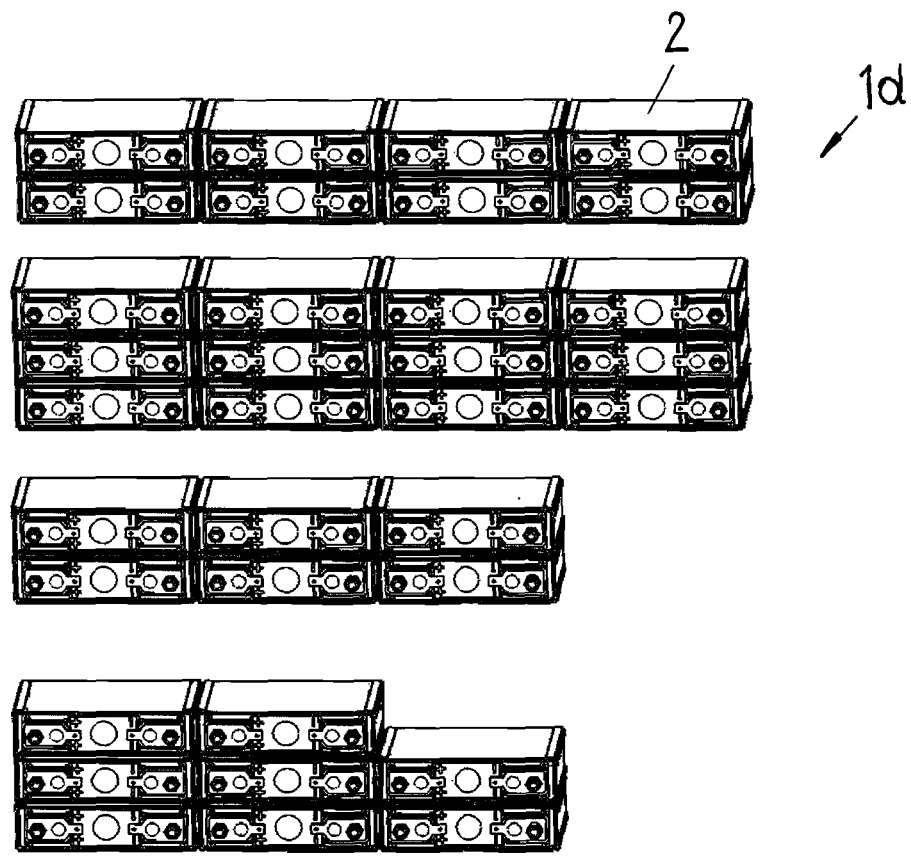
FIG. 7 illustrates various forms of batteries formed from cells as illustrated in FIG. 4.

Here, the battery 1d may be assembled in a modular manner in any desired way. For example, FIG. 7 illustrates various embodiments in this regard, specifically a 4×2 assembly, a 4×3 assembly, a 3×2 assembly and a stepped assembly. The illustrated variants are self-evidently not only suitable for a connecting method corresponding to FIGS. 4 to 6, but rather other connecting methods may self-evidently also be used to produce batteries of the type (for example the methods illustrated in FIGS. 1 to 3).

Figure 8:
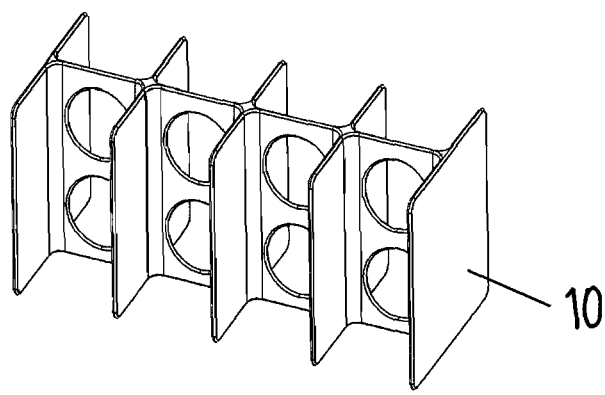
FIG. 8 illustrates a shell-shaped intermediate element provided for arranging between cells.
Figure 9:
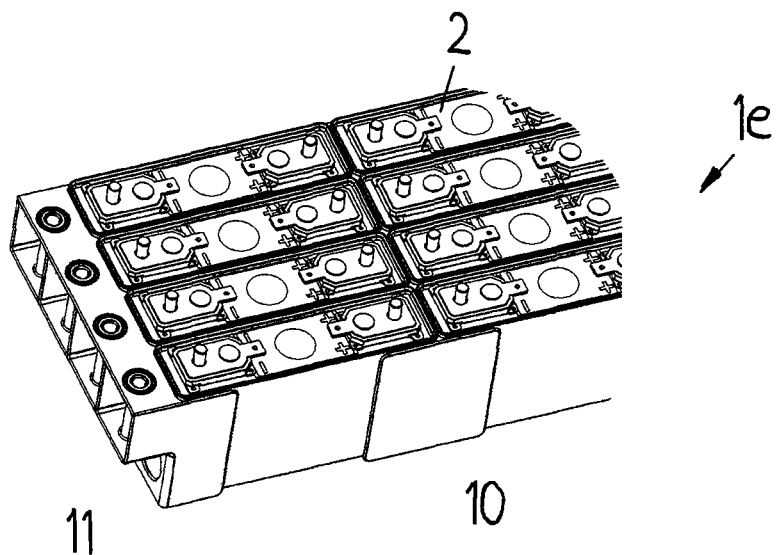
FIG. 9 illustrates a detail of a battery constructed by means of intermediate elements as illustrated in FIG. 8.

FIGS. 8 and 9 illustrate a further variant of a battery 1e in accordance with the invention, in which a plurality of cells are connected to one another by means of shell-shaped intermediate elements 10. These shell-shaped intermediate elements 10 can also be regarded as a sequence of I-shaped or H-shaped intermediate elements (see also FIG. 14). Provided at the fastening/bearing points are end elements 11 which allow the battery 1e to be mounted for example in a vehicle. To attain a self-supporting assembly, the cells 2 are for example adhesively bonded to the intermediate elements 10 and the end elements 11.

Figure 10:
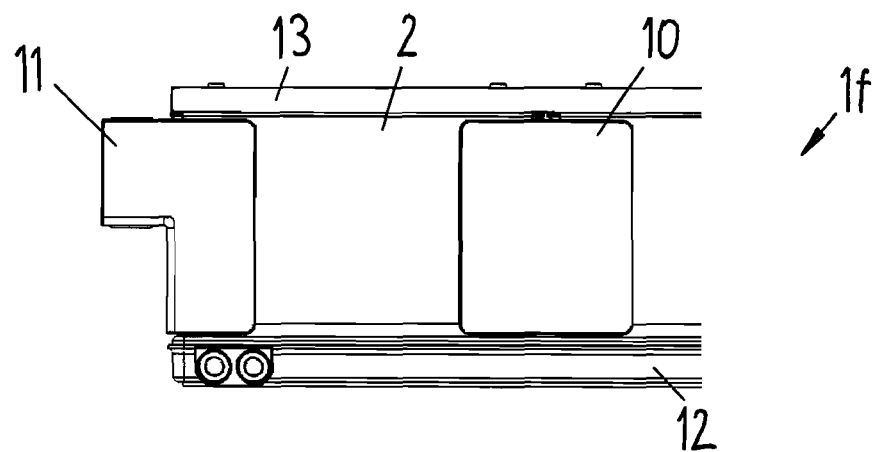
FIG. 10 illustrates the battery from FIG. 9 with an additional cooling plate and an additional cover plate in a side view.
Figure 11:
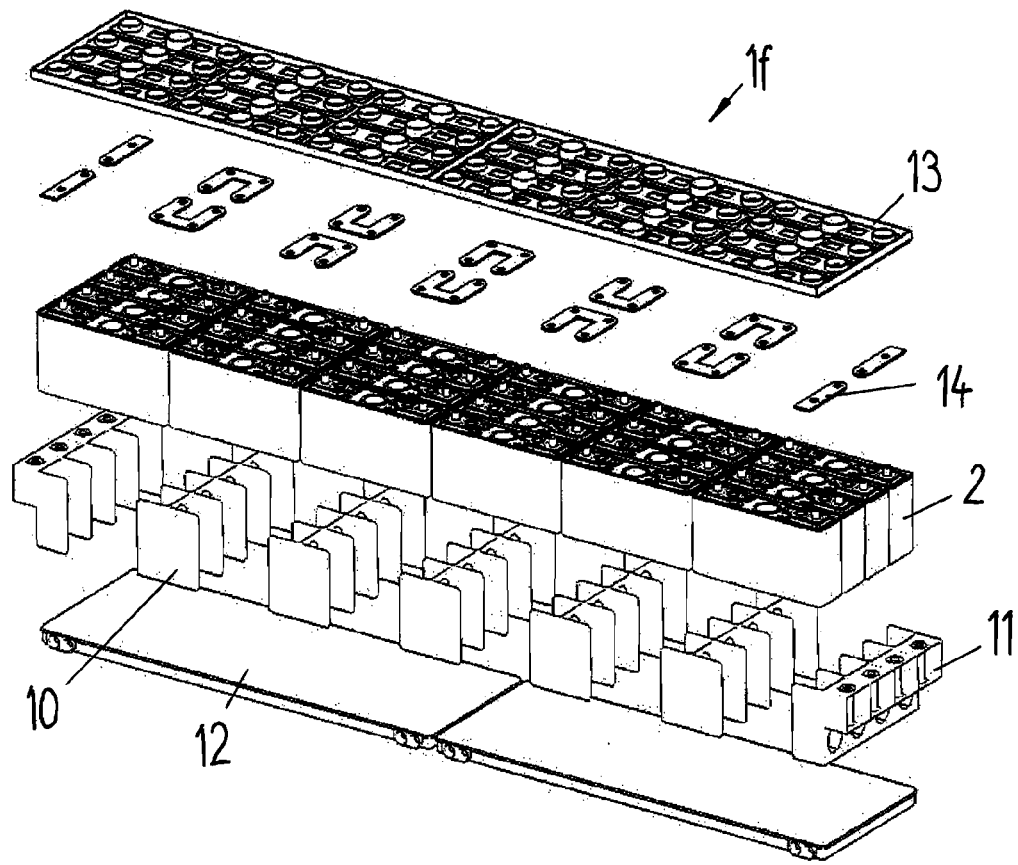
FIG. 11 illustrates the battery from FIG. 10 in an exploded illustration.
Figure 12:
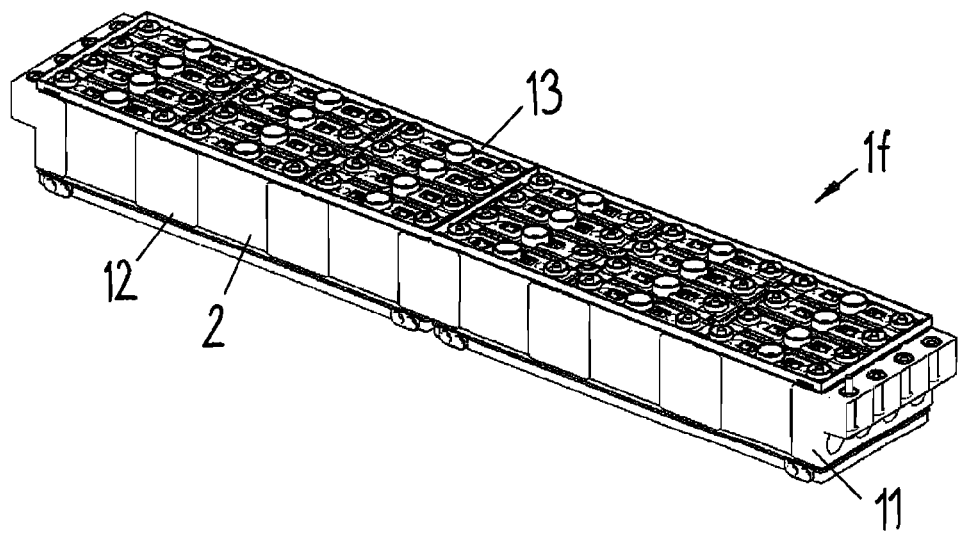
FIG. 12 illustrates the fully assembled battery from FIG. 11 in an oblique view.

FIGS. 10 to 12 illustrate a modification of the battery 1e illustrated in FIGS. 8 and 9 in the form of a battery 1f, which additionally has two cooling plates 12 for conducting a gaseous or liquid heat carrier and a cover plate 13. Additionally illustrated are cell connectors 14 which serve for producing the electrical connection between the cells 2 (note: in the preceding FIGS., cell connectors have been omitted for a clearer illustration). FIG. 10 illustrates the battery 1f in a side view, FIG. 11 illustrates the battery 1f in an exploded illustration, and FIG. 12 illustrates the battery if in an oblique view.

The cooling plates 12 and/or the cover plate 13 likewise perform a supporting function in this case. They absorb that part of the bending/shear load which remains after subtraction of the part absorbed by the cells 2. Even though the cooling plates 12 and/or the cover plate 13 perform a supporting function, a substantial part (for example 50%, 75% or 90%) is nevertheless absorbed by the cells 2.

Figure 13:
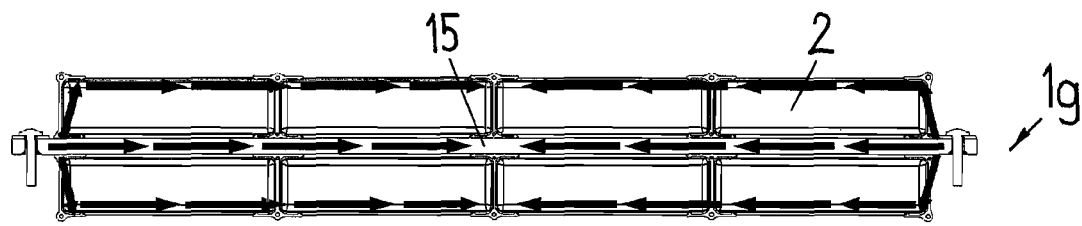
FIG. 13 illustrates a battery having a support element arranged between a plurality of cells.
Figure 14:
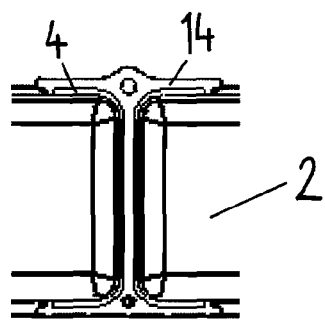
FIG. 14 illustrates a detail view of the battery illustrated in FIG. 13.
Figure 15:
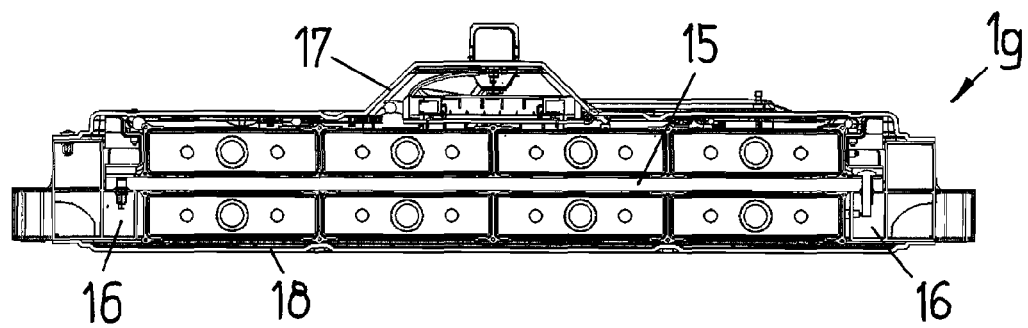
FIG. 15 illustrates the battery from FIG. 14 installed in a vehicle and protected against environmental influences by cover plates.

FIGS. 13 to 15 illustrate a further variant of a battery 1g in accordance with the invention, in which I-shaped or H-shaped intermediate elements 14 are arranged between the cells, via which intermediate elements the cells 2 are connected to one another by means of adhesive layers 4. The battery 1g additionally comprises a support element 15, for example an aluminum profile. For optimum force transmission, the cells 2 are also adhesively bonded to the support element 15, so that overall a very stable structure is obtained, since both the cells 2 and the support element 15 can absorb forces.

FIG. 13 illustrates the battery 1g additionally with arrows which are intended to indicate the force flux. It should be noted here that this is not intended to imply that only compressive stresses prevail in the component. It is self-evident that tensile stresses prevail in the lower region of the battery 1g when the battery bends downward, or is mounted horizontally at the left and at the right. FIG. 14 illustrates a detail view of an adhesive bond between two cells 2, and FIG. 15 finally illustrates the battery 1g fastened (for example screwed) to two longitudinal beams 16 of a vehicle. The battery is additionally protected against environmental influences by an upper cover 17 and a lower cover 18.

Figure 16:
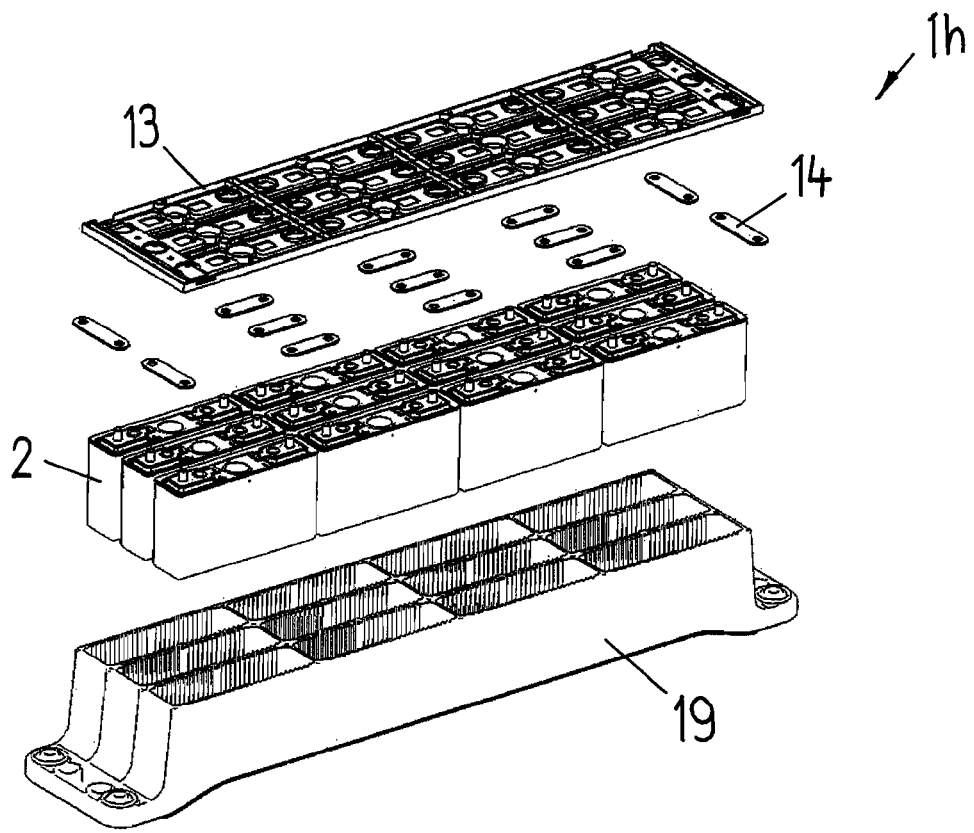
FIG. 16 illustrates, in an exploded illustration, a battery having a support element which has shell-shaped depressions.
Figure 17:
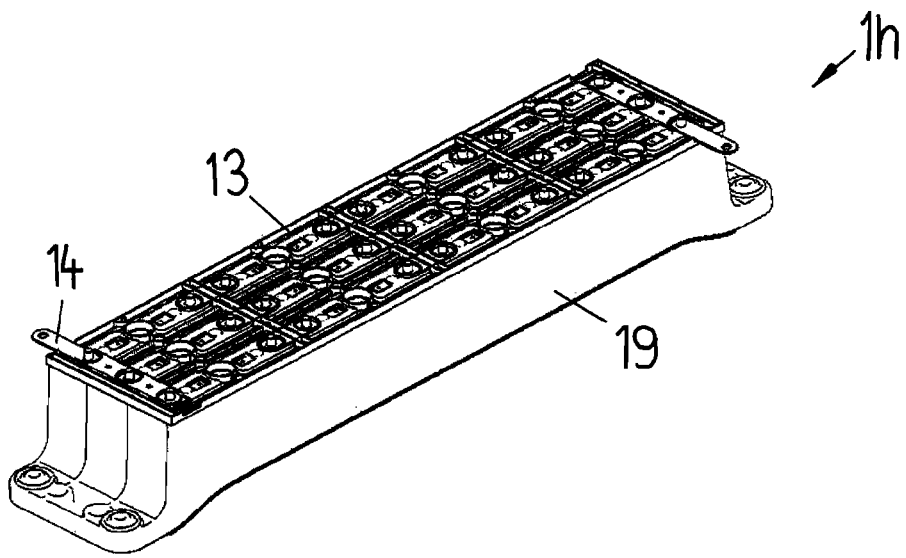
FIG. 17 illustrates the fully assembled battery from FIG. 16 in an oblique view.
Figure 18:
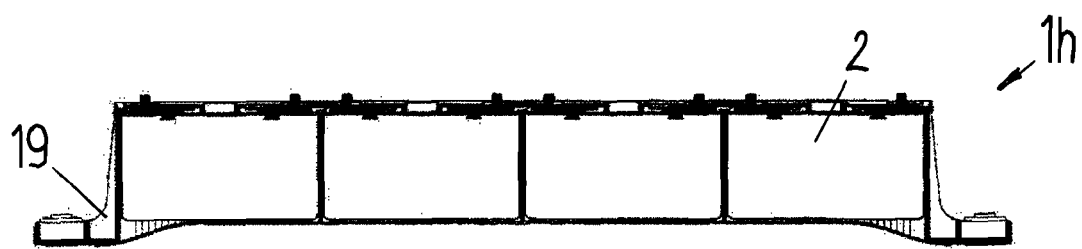
FIG. 18 illustrates the fully assembled battery from FIG. 16 in a side view.
Figure 19:
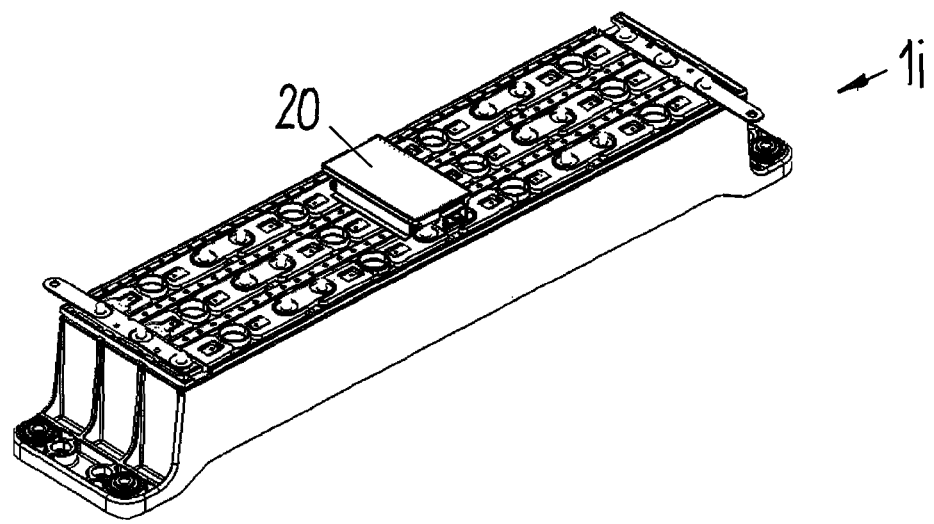
FIG. 19 illustrates the battery from FIG. 17 with an additional electronic circuit.

FIGS. 16 to 18 illustrate a further variant of a battery 1h in accordance with the invention, which is very similar to the batteries 1e and 1f illustrated in FIGS. 9 to 12. In contrast to the batteries, the battery 1h however has a support element 19 which comprises recesses or shell-shaped depressions for receiving the cells 2. Because of the I-shaped or H-shaped intermediate elements 14 which are present in any case, the webs of the shells illustraten, for example the transverse webs of the support element 19, may also partially be omitted. In this case, too, the support element 19 absorbs a part of the bending/shear load arising in the battery 1h. A substantial part is, however, also absorbed by the cells 2. The support element 19 may therefore for example be composed of relatively soft plastic, in particular if the cells 2 are adhesively bonded into the support element 19, a structure is nevertheless obtained which is capable of bearing very high loads. FIG. 16 illustrates the battery 1h in an exploded illustration, FIG. 17 illustrates the battery 1h in an oblique view, and FIG. 18 illustrates the battery in a side view, FIG. 19 illustrates a variant of a battery 1i in accordance with the invention, which is very similar to the battery 1h illustrated in FIGS. 16 to 18. In contrast thereto, the battery 1i, however, also comprises an electronic circuit 20 arranged on top of the battery 1i, the electronic circuit being, for example, a cell monitoring unit which serves, for example, for balancing the cells 2.

Figure 20:
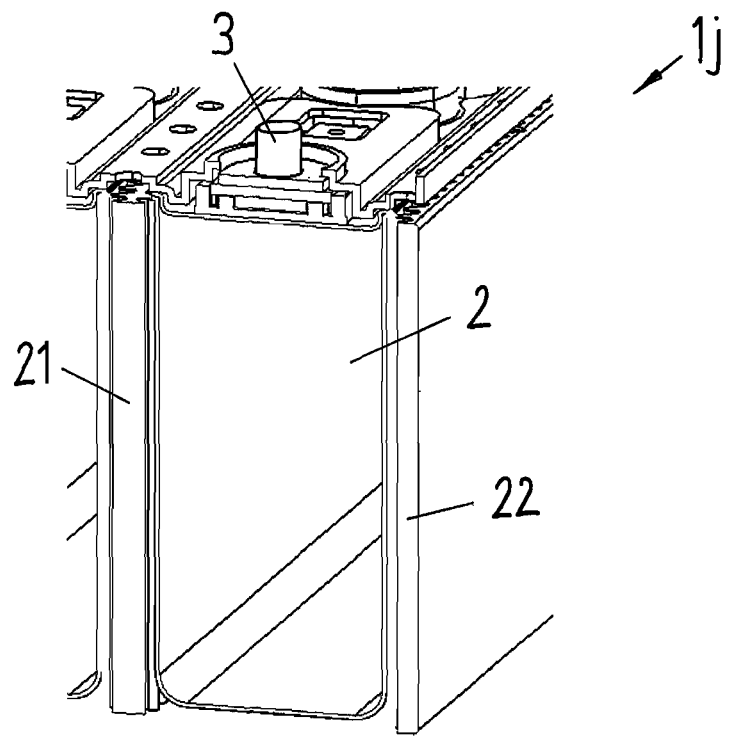
FIG. 20 illustrates, in an oblique view, a battery with plate-shaped intermediate elements which have elastic ribs.
Figure 21:
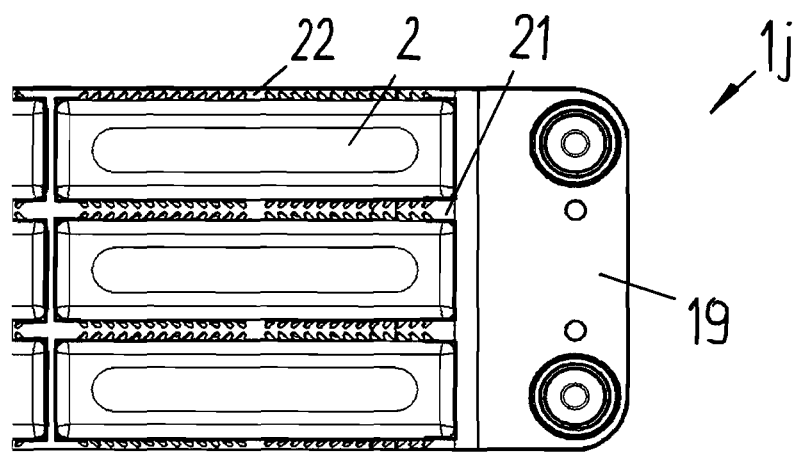
FIG. 21 illustrates the battery from FIG. 20 in a plan view.
Figure 22:
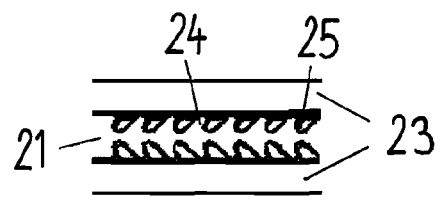
FIG. 22 illustrates a plate having elastic ribs in a detail view.

FIGS. 20 to 22 illustrate yet another variant of a battery 1j in accordance with the invention in which a plate-shaped intermediate element 21 which has elastic ribs 24 on both sides is arranged at least between two voltage-generating cells 2. Furthermore, on the edge of one cell 2, there is provided a plate-shaped intermediate element 22 which has elastic ribs 24 on the side facing towards the cell 2. The ribs in this case bear against a cell 2 or else against an I-shaped or H-shaped intermediate element 14 and, owing to their permit length compensation between the cells 2. Furthermore, a groove between two ribs 24 forms, together with the housing 23 of the cell 2, a channel 25 which is provided for conducting a gaseous or liquid heat carrier. The intermediate elements 21 and 22 thus perform a dual purpose. The cells 2 are arranged together with the intermediate elements 21 and 22 in a support element 19. FIG. 20 illustrates the battery 1j in an oblique view, FIG. 21 illustrates the battery 1j a plan view, and FIG. 22 illustrates the formation of a channel 25 in a detail view.

Figure 23:
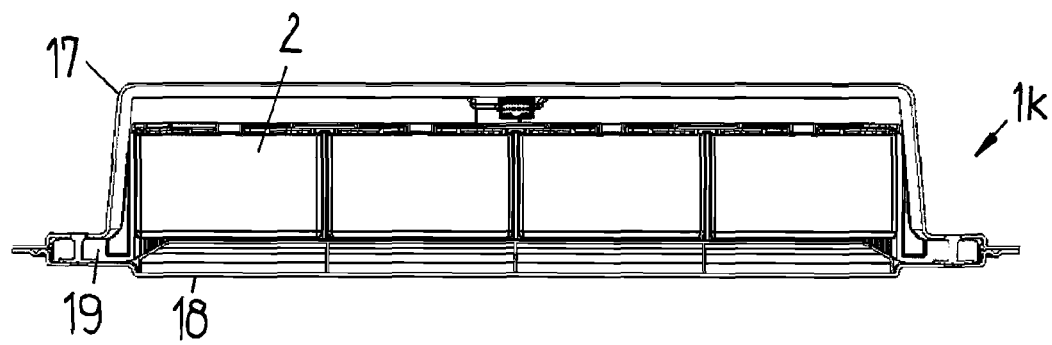
FIG. 23 illustrates, in a side view, the battery from FIG. 21 with an additional upper and lower cover.
Figure 24:
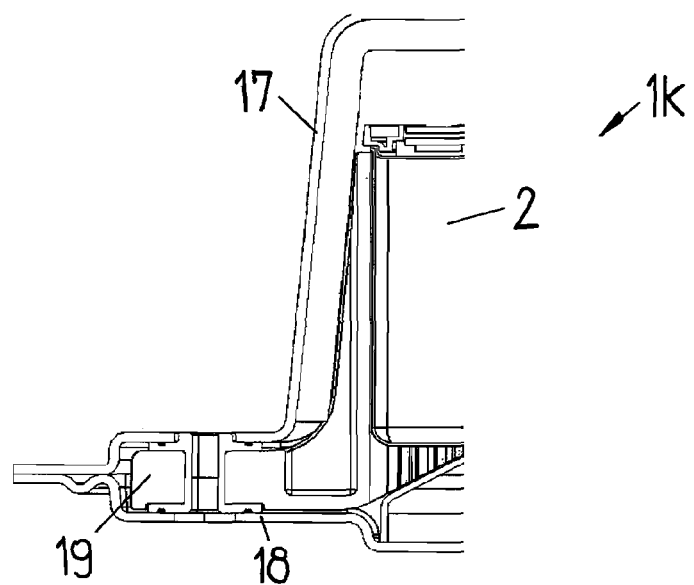
FIG. 24 illustrates a detail view of the battery from FIG. 23.

FIGS. 23 to 24 illustrate a further variant of a battery 1k in accordance with the invention which is very similar to the battery 1j illustraten in FIGS. 20 to 22. In contrast thereto, an upper cover 17 and a lower cover 18 are arranged around the assembly comprising the support element 19, the cells 2 and the intermediate elements 21 and 22. The covers 17 and 18 may self-evidently also perform a supporting function, that is to say absorb part of the bending load acting on the battery 1k. To prevent buckling or bulging of the relatively thin covers 17 and 18, these may also be provided with beads and/or ribs.

Figure 25:
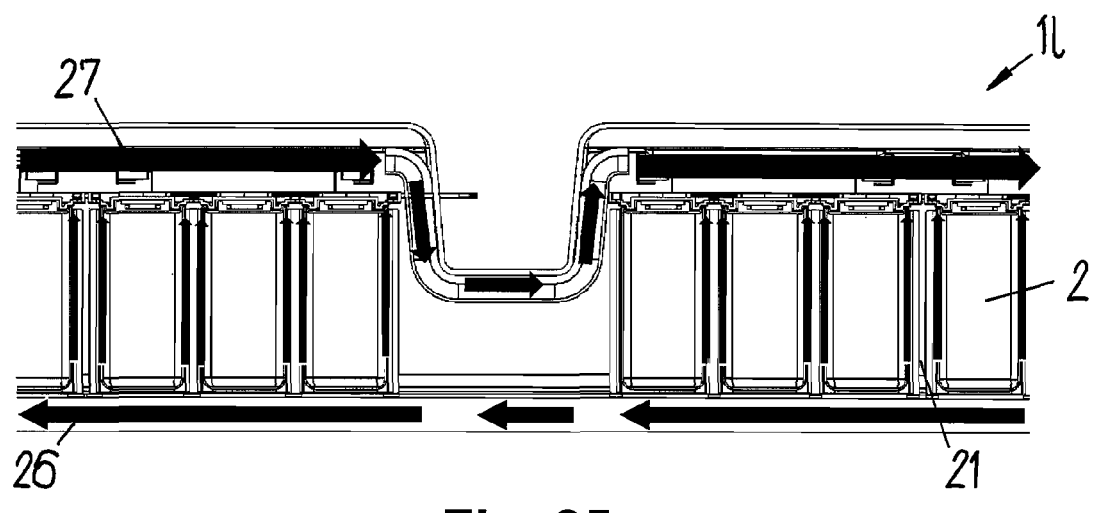
FIG. 25 illustrates a battery having a hollow support element which is provided for conducting a heat carrier.

FIG. 25 finally illustrates a further variant of a battery 1l in accordance with the invention, which comprises an arrangement of cells 2 and intermediate elements 21 and 22 as already illustraten in FIG. 20, and also a lower support element 26 and an upper support element 27. The two support elements 26 and 27 are hollow and are provided for conducting a gaseous or liquid heat carrier. Specifically, the heat carrier flows via the lower support element 26 (which forms the inlet), the ducts 25 (see also FIG. 22) and the upper support element 27 (which forms the outlet). Since the pressure of the heat carrier varies along the support elements 26 and 27, it is possible for holes of different size via which the heat carrier flows to or from the ducts 25 to be provided in the support elements 26 and 27 in order to attain a uniform flow through the ducts 25. It is self-evidently also possible for the upper support element 27 to form the inlet and for the lower support element 26 to form the outlet.

The batteries 1a to 11 illustrated in FIGS. 1 to 25 thus have a plurality of voltage-generating cells 2 arranged adjacent to one another in the position of the battery 1a to 1d illustraten. The batteries 1a to 11 furthermore have a plurality of fastening/bearing points which are spaced apart from one another and on which the batteries 1a to 11 are fastened or bear. Here, at least a first portion of the cells 2 with a first mass, and optional further constituent parts of the battery 1a to 11 with a further mass, come to rest between the fastening/bearing points.

The first portion of the cells 2 is now designed to absorb at least a substantial part of the bending/shear load arising between the fastening/hearing points. The bending/shear load is caused for example by the acceleration acting in the vertical direction on the first mass and the optional further mass, for example, when the battery 1a to 11 is installed/used substantially in a horizontal position. The bending/shear load may however also be caused by the acceleration acting in the horizontal direction on the first mass and the optional further mass, for example, if the battery 1a to 11 is installed/used substantially in a vertical position. Mixed forms are self evidently also conceivable, for example if the battery 1a to 11 is installed obliquely, or if the bearing/fastening points are spaced apart from one another both horizontally and also vertically. It is in particular also conceivable for the structure formed by the battery 1a to 11 to be of cantilever form at least in sections.

It is pointed out at this juncture that the batteries 1a to 11 illustrated in FIGS. 1 to 25 may also be varied, in particular combined with one another.

Finally, it is pointed out that FIGS. 1 to 25 are in part highly simplified diagrammatic illustrations. In reality, a battery 1a to 11 in accordance with the invention may also deviate from the illustration, in particular may comprise additional components not illustrated here. It is finally pointed out that the illustrations are not necessary to scale, and proportions of real components may deviate from the proportions of the components illustrated.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A battery comprising:
   a plurality of voltage-generating cells;
   a plurality of fastening points which are spaced apart from one another and on which the battery is fastened; and
   an intermediate element arranged at least between adjacent voltage-generating cells to fix the adjacent voltage-generating cells to one another;
   wherein the voltage-generating cells each have at least a first portion configured to absorb at least a predetermined portion of a bending/shear load arising in the battery between the fastening points, the first portion having a first mass arranged between the fastening points.

2. The battery of claim 1, wherein at least two fastening points are spaced apart horizontally from one another and the battery is mounted in a substantially horizontal position to intentionally allow the first portion to absorb the predetermined portion of the bending/shear load resulting from an acceleration acting in a vertical direction on the first portion.

3. The battery of claim 1, wherein at least two fastening points are spaced apart vertically from one another and the battery is mounted in a substantially vertical position to intentionally allow the first portion to absorb the predetermined portion of the bending/shear load resulting from an acceleration acting in a horizontal direction on the first portion.

4. The battery of claim 1, wherein the predetermined portion comprises between 50% and 99.9% of the total bending/shear load arising in the battery when in motion.

5. The battery of claim 1, wherein the first portion is configured to absorb the entire bending/shear load arising between the fastening points arising in the battery when in motion.

6. The battery of claim 1, wherein an elastic rib contacts at least one of the voltage-generating cells to deform and provide length compensation, and a groove which together with the voltage-generating cell, defines a channel through which one of a gas or liquid flows and which absorbs heat from the voltage-generating cells.

7. The battery of claim 1, wherein at least two adjacent voltage-generating cells and at least one intermediate element are adhesively bonded to one another.

8. The battery of claim 1, wherein at least two adjacent voltage-generating cells and at least one intermediate element are mechanically fastened to one another.

9. The battery of claim 1, further comprising tension elements configured to press at least two adjacent voltage-generating cells and at least one intermediate element against one another through the generation of a compressive preload.

10. The battery of claim 9, wherein the tension elements comprises one of tension straps and tension rods.

11. The battery of claim 1, further comprising a support element which spans at least two fastening points and which absorbs at least a portion of the bending/shear load not absorbed by the voltage-generating cells, wherein the support element is more fragile relative at least to the plurality of voltage-generating cells.

12. The battery of claim 11, wherein the support element comprises a heat exchanger configured to absorb heat from the voltage-generating cells.

13. The battery of claim 11, wherein the support element is located only at one side of the voltage-generating cells, wherein the support element is hollow and through which flows one of a gas and liquid which absorbs heat from the voltage-generating cells.

14. The battery of claim 1, wherein the intermediate element has one of an I-shaped and H-shaped cross-section.

15. A battery comprising:
a plurality of voltage-generating cells;
a plurality of fastening points on which the battery is fastened; and
an intermediate element arranged at least between adjacent voltage-generating cells;
a support element configured to absorb at least a portion of a bending/shear load arising in the battery between the fastening points and also which absorb heat from the voltage-generating cells, wherein the support element is more fragile relative at least to the plurality of voltage-generating cells;
wherein the voltage-generating cells each have at least a first portion configured to absorb at least a portion of the bending/shear load.

16. The battery of claim 15, wherein the support element is located only at one side of the voltage-generating cells, wherein the support element is hollow and through which flows one of a gas and liquid which absorbs heat from the voltage-generating cells.

17. The battery of claim 15, further comprising tension elements configured to press at least two adjacent voltage-generating cells and at least one intermediate element against one another through the generation of a compressive preload.

18. The battery of claim 1, wherein the intermediate element includes one or more of:
an element arranged only between edges of at least two adjacent voltage-generating cells;
an element arranged adjacent two or more sides of at least one adjacent voltage-generating cell; and
an element including a deformable elastic rib arranged adjacent at least one adjacent voltage-generating cell.

19. The battery of claim 18, wherein the intermediate element includes:
a cross shaped element arranged only between an edge of a first adjacent voltage-generating cell, an edge of a second adjacent voltage-generating cell, an edge of a third adjacent voltage-generating cell, and an edge of a fourth adjacent voltage-generating cell an edge of a first adjacent voltage-generating cell;
a shell shaped element arranged adjacent three sides of a fifth adjacent voltage-generating cell and adjacent three sides of a sixth adjacent voltage-generating cell; and a plate shaped element including an elastic rib on two sides thereof to contact at least one of a seventh adjacent voltage-generating cell and an eight adjacent voltage-generating cell to deform and provide length compensation.

* * * * *